(12) United States Patent
Sundaresan et al.

(10) Patent No.: US 8,310,975 B2
(45) Date of Patent: Nov. 13, 2012

(54) OPTIMAL BEAM SCHEDULING FOR MULTICASTING IN WIRELESS NETWORKS

(75) Inventors: Karthikeyan Sundaresan, Howell, NJ (US); Kishore Ramachandran, North Brunswick, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 306 days.

(21) Appl. No.: 12/692,303

(22) Filed: Jan. 22, 2010

(65) Prior Publication Data
US 2010/0238851 A1 Sep. 23, 2010

Related U.S. Application Data

(60) Provisional application No. 61/159,380, filed on Mar. 11, 2009.

(51) Int. Cl.
*H04H 20/71* (2008.01)
*H04W 4/00* (2009.01)
*H04M 1/00* (2006.01)

(52) U.S. Cl. ...... 370/312; 370/329; 370/432; 455/562.1
(58) Field of Classification Search .............. None
See application file for complete search history.

(56) References Cited

U.S. PATENT DOCUMENTS

| | | | |
|---|---|---|---|
| 2003/0223393 A1* | 12/2003 | Lee ............................ | 370/335 |
| 2006/0025178 A1* | 2/2006 | Tao et al. .................... | 455/562.1 |
| 2008/0062923 A1* | 3/2008 | Ponnuswamy ............. | 370/331 |
| 2008/0261658 A1* | 10/2008 | Jin et al. .................... | 455/562.1 |
| 2008/0273458 A1* | 11/2008 | Guo et al. .................. | 370/229 |
| 2011/0317607 A1* | 12/2011 | Wu et al. .................... | 370/312 |

OTHER PUBLICATIONS

Link Layer Multicasting with Smart Antennas: No Client Left Behind Souvik Sen, Jie Xiong, Rahul Ghosh, Romit Roy Choudhury, International Conference on Network Protocols (ICNP) 2008.

* cited by examiner

*Primary Examiner* — Steven H Nguyen
(74) *Attorney, Agent, or Firm* — Joseph Kolodka; Bao Tran

(57) ABSTRACT

Systems and methods are disclosed to partition a multicast group into a plurality of partitions where each partition has a mutually exclusive subset of users or clients; scheduling beam transmission with switched beamforming antennas; and performing the multicast transmission in accordance with the beam scheduling.

19 Claims, 5 Drawing Sheets a) Single-lobe (sequential) Beamforming   b) Multi-lobe Beamforming

| SINR (dB) | Rate | SINR (dB) | Rate |
|---|---|---|---|
| 802.11a | | | |
| ≥ 24.56 | 54 | [10.79,17.04) | 18 |
| [24.05,24.56) | 48 | [9.03,10.79) | 12 |
| [18.8,24.05) | 36 | [7.78,9.03) | 9 |
| [17.04,18.8) | 24 | [6.02,7.78) | 6 |
| 802.11b | | | |
| ≥ 12 | 11 | [5.03,9.02) | 2 |
| [9.02,12) | 5.5 | [2.01,5.03) | 1 | c) SINR-Rate Tables

OPTIMAL BEAM SCHEDULING FOR MULTICASTING IN WIRELESS NETWORKS

This application claims priority to Provisional Application Ser. No. 61/159,380 filed Mar. 11, 2009, the content of which is incorporated by reference.

This application relates to optimal beam scheduling for multicasting in wireless networks.

BACKGROUND

With the advent of mobile computing devices, and the rapid growth in applications involving group communication (electronic classrooms, MobiTV, quad-play cable services, social networking, among others), efficient link layer multicasting is emerging as a key requirement for wireless networks. As opposed to existing broadcast/multicast viewership models, users are increasingly demanding the ability to view media content on wireless devices, at a time and/or place of wiring costs in existing environments targeting group communications such as conference rooms, lecture halls, for example.

While the broadcast nature of the wireless medium intrinsically supports multicasting, link performance is dictated by that of the weakest client(s). With their ability to maximize performance in low signal-to-noise ratio (SNR) environments, beamforming antennas provide a natural solution to this problem. Beamforming antennas focus the signal energy in specific directions to provide an improved SNR (array gain) at the client. Beamforming could be either adaptive where the beam patterns are computed on the fly based on channel feedback, or switched, where precomputed beams are used. Switched beamforming, which provides a balance between performance and complexity, aims to radiate energy in a desired direction towards the receiver. While the performance gains from switched beamforming are expected in line-of-sight (LOS) rich environments outdoors, gains can be had even within an indoor environment. In fact, due to the strong LOS nature of indoor channels, switched beamforming has been made a defacto choice in some of next generation indoor wireless standards.

There is an inherent tradeoff between multicasting and beamforming. While beamforming provides increased signal strength (array gain), leading to increased data rates, it reduces the signal footprint, thereby restricting the wireless broadcast advantage (WBA)—a key factor for multicast applications. On the other hand, omni-directional transmissions, while completely leveraging the benefits of WBA, are not able to avail any of the array gain and the consequent data rate increase. This makes the problem of multicasting with beamforming antennas especially challenging.

FIGS. 1(a)-(c) show two exemplary topologies with an eight element antenna at the access point (AP). In the topology 1 of FIG. 1(a), the RSSI at clients A and B due to the exemplary eight element AP is 8 dB and 10 dB respectively, which corresponds to an omni RSSI of 2 dB and 4 dB respectively (with a 6 dB array gain) in this example. For 802.11b rates, a packet of L Mbits would require a total time of L (seconds) at a bottleneck rate of 1 Mbps for the omni strategy (SO). On the other hand, with SB, a transmission on beam 1 to client A at 2 Mbps, followed by a transmission on beam 2 to client B at 5.5 Mbps yields a total time of only 0:68 L, which is a 32% gain over omni.

On the other hand, FIG. 1(a) using topology 2 with four clients (A, B, C, D) having RSSI of 8.5, 12, 8.5, and 12 dB respectively. While SO would require a total time of L, SB would incur four transmissions; two at 2 Mbps rate each and the other two at 11 Mbps rate each, resulting in a total time of 1:182 L, which is a 20% loss compared to omni that can be attributed to the loss in WBA.

Thus, while beamforming has the potential to improve multicast performance, failure to address the tradeoff with WBA could even degrade its performance worse than omni.

SUMMARY

In one aspect, systems and methods are disclosed to partition a multicast group into multiple partitions where each partition has a mutually exclusive subset of users/clients.

In another aspect, the system partitions a multicast group into a plurality of partitions where each partition has a mutually exclusive subset of users or clients; scheduling beam transmission with switched beamforming antennas; and performing the multicast transmission in accordance with the beam scheduling.

In yet another aspect, a system includes a group of multicast users; and a transmitter with switched beamforming antennas, wherein the transmitter partitions the group of multicast users into multiple partitions where each partition has a mutually exclusive subset of users and wherein the transmitter performs multicasting to the users.

Implementations of the above system may include one or more of the following. The users in the same partition are sent the multicast data through a broadcast. Also, users in different partitions are sent data sequentially. The transmitter determines a composite beam pattern and rate for transmission to each of the partitions. The transmitter transmits multicast data through a composite beam pattern at a rate such that all that all users in the partition can decode the transmitted data. In the equal power split implementation, the optimal solution partitions the set of beams (arranged in decreasing order of effective RSSI) in a contiguous manner. With equal power split, the optimal solution picks a composite beam pattern and rate for each partition such that the aggregate transmission time is minimized for both continuous and discrete rates. With equal power split, a low complexity near optimal solution picks a composite beam pattern and rate for each pattern such that the aggregate transmission time is minimized for both continuous and discrete rates by employing the notion of effective cost of partitions. In an asymmetric power control embodiment, the optimal solution for continuous rates picks a single composite beam pattern, transmission rate for each pattern and power allocation to constituent beams in the composite pattern, such that the aggregate transmission time is minimized. With asymmetric power control, a near-optimal solution for discrete rates partitions the set of beams non-contiguously. Further, in the asymmetric power control, a near-optimal solution for discrete rates picks for every partition a composite beam pattern, transmission rate for each pattern and power allocation to constituent beams in the composite pattern, such that the aggregate transmission time is minimized.

Advantages of the preferred embodiments may include one or more of the following. The invention efficiently solves the problem of multicasting in wireless networks with the help of beamforming techniques. The solutions that the invention describes are applicable to wide-area wireless technologies such as WiMAX and LTE as well as indoor wireless technologies such as WiFi and 60 GHz based technologies (WirelessHD, WiGiG etc.).

Other advantages may include the following. The system provides a higher quality solution in terms of minimizing the total multicast transmission time compared to conventional systems. The system provides flexibility in terms of being able to leverage power control, if the system allows such control, to allow faster multicast transmissions. The system considers practical restrictions such as discrete rates in designing the solutions.

Yet other advantages may include the following. The system achieves an optimal solution through the use of composite (multi-lobe) beam patterns. By varying the signal footprint on a fine granularity, relative to purely directional and omni approaches, composite beams provide good control the operating point of the tradeoff curve. By adjusting the power across the different main lobes in a composite beam, the system can further control the signal footprint and strike this tradeoff more effectively. In the first model (EQP), the transmit power is equally split among the main lobes of the composite beam. In the second model (ASP), power is allowed to be asymmetrically split between the constituent main lobes. This allows the signal to be reinforced more in certain main lobes as opposed to the others and provides more flexibility in forming the composite beam.

Additional advantages may include the following. In addition to the generation of an optimal beam pattern, the system also addresses the closely coupled issue of scheduling of beam patterns since it can be sub-optimal to transmit to all clients simultaneously using a single composite beam pattern or to beamform sequentially (using single lobe patterns) in each of the directions to cover all clients. Thus, the system performs scheduling (partitioning) of users into groups that will operate in different timeslots, and determining the optimal beam patterns and rate of operation for each group. The system provides optimal solutions under both the models for the continuous rate (Shannon rate function) case. The system also uses easy-to-implement greedy solutions with performance guarantees for both the models that exhibit near optimal performance. The greedy solutions are readily extended to the discrete rate case (eg. 802.11a/b), which is the practical model of operation in wireless standards. In one comprehensive test, the system achieves performance gains of four folds over omni and two folds over baseline schemes and schemes in related work. The simple greedy nature of the solutions also lends itself to easy implementation and deployment.

DESCRIPTION

Two embodiments are presented in the following discussion: one where the power on each of the beams is split equally and fixed (EQP Model) and another where different power levels can be independently allocated to the beams (ASP Model).

Figure 1:
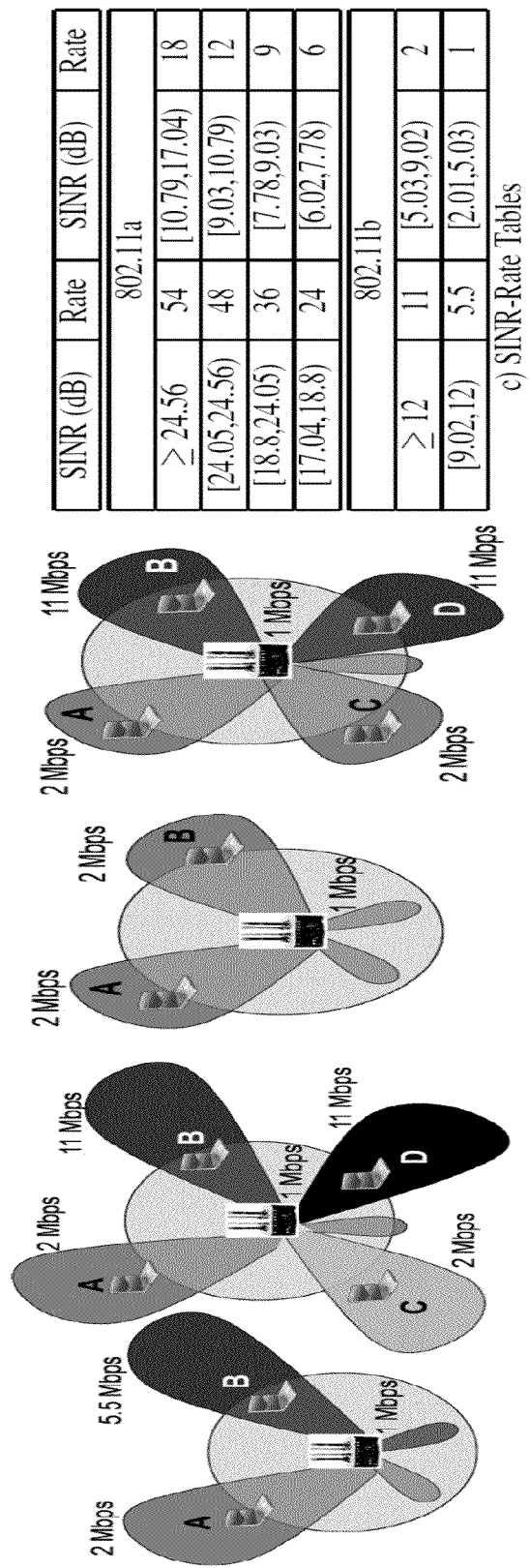
FIGS. 1(a)-(c) show and exemplary multicasting illustration with a rate table.
Figure 2:
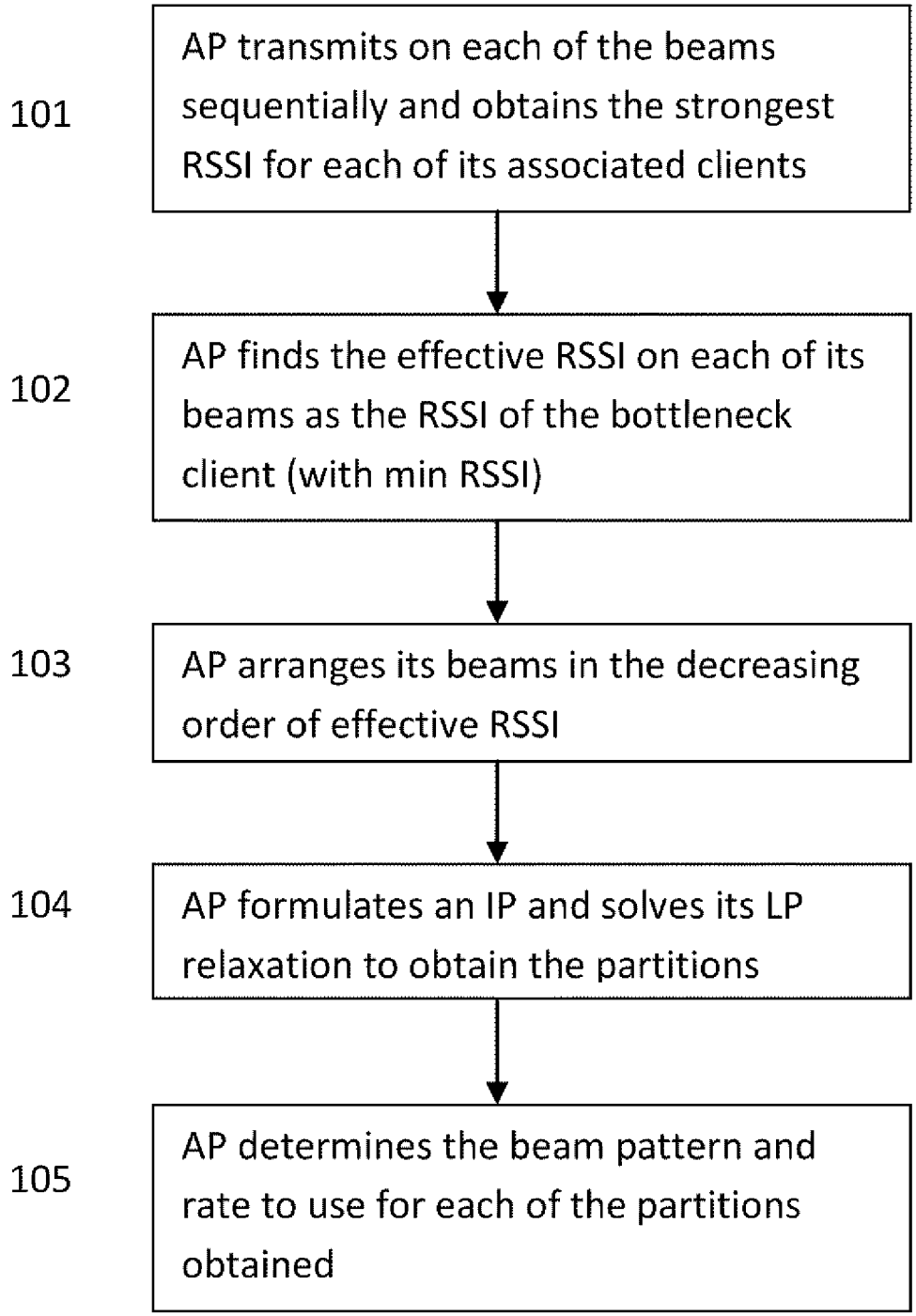
FIG. 2 shows an exemplary multicast beam scheduler process for the EQP Model.

FIG. 2 shows an exemplary multicast beam scheduler process for the EQP Model. The sequence of operations in obtaining the optimal multicast transmission strategy is outlined in the flowcharts below for both the continuous and discrete rate cases. The embodiment of FIG. 2 includes the following operations.

First, in 101, the access point (AP) transmits sequentially on all its beams and the clients determine the beam on which the strongest RSSI (received signal strength indicator) was received as well as the corresponding RSSI value. Every client feeds back the strongest RSSI and the corresponding beam identification. Next, in 102, the AP then determines the effective RSSI (Rj*) for each of the possible switched beams (there could be a total of K beams for a K element antenna array) as the RSSI of the bottleneck client, namely the client reporting the lowest RSSI on that beam.

$$R_j^* = \min_{i:b_{ij}^* = j} \{R_{ij}^*\}; \ \forall j \in [1, K]$$

In 103, effective RSSIs are arranged in a decreasing order. In 104, in one embodiment, the following integer program (IP) is formulated.

$$SPP: \text{Minimize} \sum_{j=1}^{M} c_j y_j; \ \text{s.t.} \ \sum_{j=1}^{M} a_{ij} y_j = 1, \ \forall \ i \in [1, K]$$

$$\text{where } c_j = \frac{L}{B \log_2\left(1 + \frac{\min_i \{a_{ij} R_j^*\}}{\sum_i a_{ij}}\right)}; \ a_{ij}, y_j = \{0, 1\}$$

The integral values of 'y' are relaxed and the corresponding linear program (LP) is then solved. The solution for 'y' ends up being integral due to a property of the assignment matrix and these values in turn provide the optimal partitions that we desire.

In 104, for each of the partitions, the process then determines the beam pattern (which could be multi-lobe) and the rates to be used to transmit for each pattern as follows:

$$B_j(k) = \sum_{i \in [1,K]} \frac{A(k, i-1) a_{ij}}{\sum_i a_{ij}}$$

$$\text{Rate}_j = c_j$$

The values of 'a' and 'c' are obtained from the LP, while A(k,i−1) are the beam pattern coefficients corresponding to each of the main lobes constituting the composite multi-lobe pattern.

Next, in 105, the process uses these beam patterns and rates to transmit data to the users in a partition one partition at a time.

The invention efficiently solves the problem of multicasting in wireless networks with the help of beamforming techniques. The solutions that the invention describes are applicable to wide-area wireless technologies such as WiMAX and LTE as well as indoor wireless technologies such as WiFi and 60 GHz based technologies (WirelessHD, WiGiG, etc.).

The embodiment of FIG. 2 is based on a Linear Programming formulation and although this embodiment provides the optimal solution and can be solved in polynomial time, a greedy algorithm with smaller running time can be developed as shown below, which is applicable to both the continuous and discrete rate case.

| Algorithm I Multicast Beam Scheduler for EQP: MEP |
|---|
| 1:    AP obtains the bottleneck (effective) RSSI for each of its active beams in B, $R_j^* = \min_{i:b_{ij}^*=j}\{R_{ij}^*\}$, $\forall j \in [1, [1, |B|]$ |
| 2:    AP arranges the beams in the decreasing order of effective RSSI. |
| 3:    AP solves the LP relation of SPP: $\{p : y_p = 1\}$ yields the partitions with # partitions being $G = \Sigma_p y_p$. |
| 4:    % AP determines beam patterns and rates for each of the partitions output by the LP |
| 5:    for all $p \in [1, G]$, $p : y_p = 1$ do |
| 6:      $B_p(k) = \Sigma_{j \in [1,|B|]} \dfrac{A(k, j-1)a_{jp}}{\sqrt{\Sigma_j a_{jp}}}$ |
| 7:      $Rate_p = c_p$ |
| 8:    end for |

Figure 3:
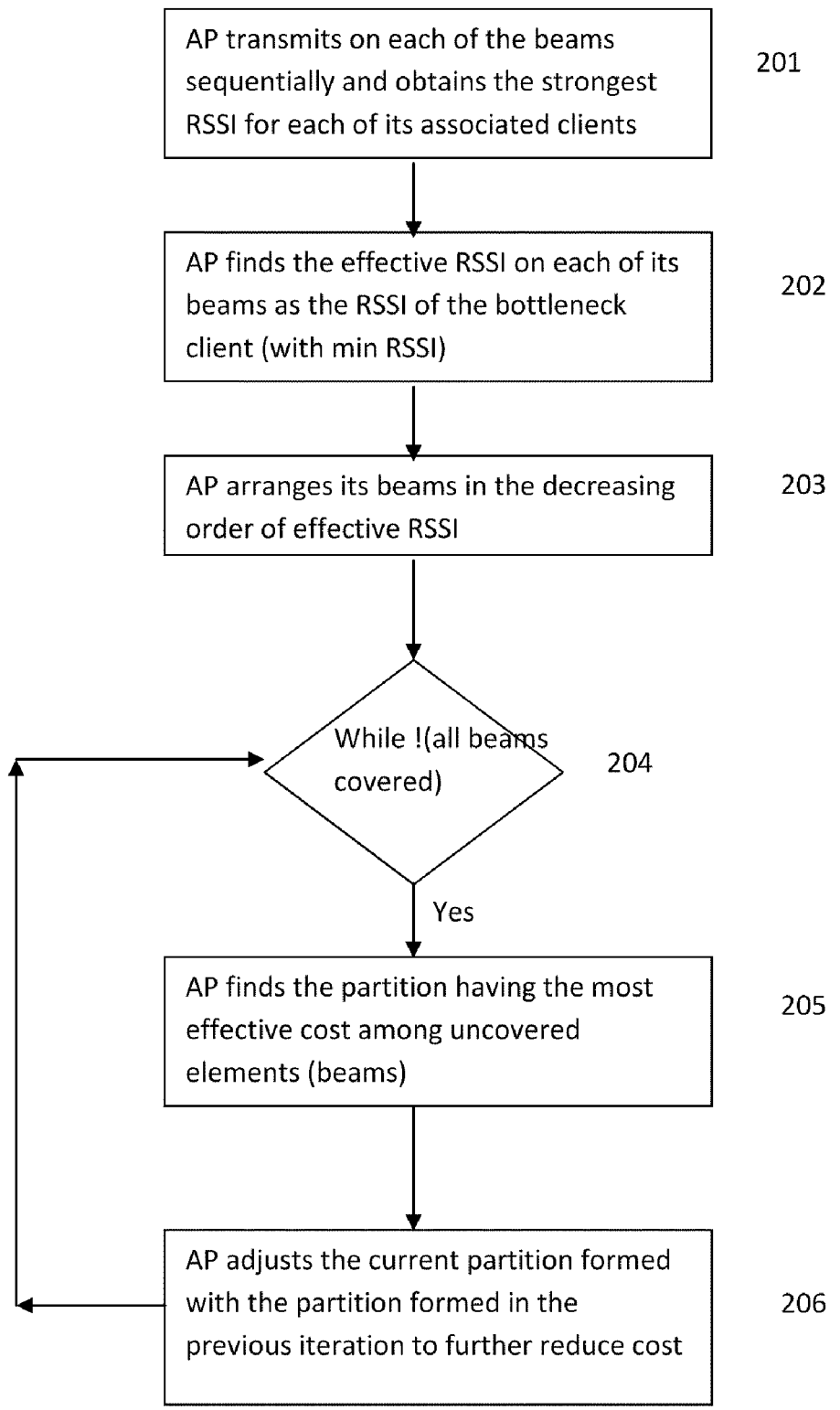
FIG. 3 shows an exemplary Low-complexity Greedy Solution.

FIG. 3 shows an exemplary Low-complexity Greedy Solution. The low complexity greedy solution of FIG. 3 consists of two components: 1) partition estimation (Steps 3-15 in the pseudo code provided) and 2) partition refinement (Steps 22-28 in the pseudo code provided).

First, in 201, the access point (AP) transmits sequentially on all its beams and the clients determine the beam on which the strongest RSSI (received signal strength indicator) was received as well as the corresponding RSSI value. Every client feeds back the strongest RSSI and the corresponding beam identification.

In 202, the AP then determines the effective RSSI (Rj*) for each of the possible switched beams (there could be a total of K beams for a K element antenna array) as the RSSI of the bottleneck client, namely the client reporting the lowest RSSI on that beam.

$$R_j^* = \min_{i:b_{ij}^*=j}\{R_{ij}^*\}; \forall j \in [1,K]$$

In 203, the effective RSSIs are arranged in a decreasing order. In 204, at every iteration, the AP checks if all elements (beams) are assigned (covered) to some partition or the other. If not, it performs the following set of operations. In 205, the AP determines the contiguous set of elements (partition) from the remaining set of un-covered elements, that provide the lowest effective partition cost. This is achieved by the following sub-steps that are available in the pseudo code of the complete process provided.

$prev = 0$ $min\_cost = MAX$, $new = 0$ for $i \in [prev + 1 : K]$ do $$cost_{\it eff} = \frac{L/B}{(i - prev)\log_2\left(1 + \dfrac{\prod(i)}{i - prev}\right)}$$

if $cost_{\it eff} \leq min\_cost$ then $new = i$ end end for

The effective cost of a partition is obtained by the cost of the partition divided by the number of elements covered by the partition. In other words, it measures the unit cost of a partition for every element covered.

In 204, the AP then refines the current partition obtained with the partition formed in the previous iteration to see if the cost can be further reduced.

$min\_cost = MAX$, $prev\_ref = prev$ for $k \in [P[n-2] : P[n]]$ do $$cost = \frac{L}{B\log_2\left(1 + \dfrac{\prod(k)}{k - P[n-2]}\right)} + \frac{L}{B\log_2\left(1 + \dfrac{\prod(P[n])}{P[n] - k}\right)}$$

end for if $cost < min\_cost$ then $prev\_ref = k$ end $P[n-1] = prev\_ref$

Next, in 205, once partitions are obtained, AP determines the rate of transmission (from the cost) as well as the composite multi-lobe beam pattern (based on constituent beams and equal power split) to be used for each transmission as follows.

for $q \in [1, |P|]$ do $$B_q(k) = \frac{\sum_{i=P[q-1]}^{P[q]} A(k, b_{\prod(i)} - 1)}{P[q] - P[q-1]}$$

$$Rate_q = \frac{L}{B\log_2\left(1 + \dfrac{\prod(P[q])}{P[q] - P[q-1]}\right)}$$

end for

Note that for discrete rate function, the logarithmic function for cost can be replaced by the discrete rate function used by the wireless transmission technology.

To summarize, at a high level, the greedy solution determines a set of contiguous partitions of users (where contiguity is in terms of order in which the elements are arranged in the order of minimum effective RSSI of the beams). A partition is first selected greedily without altering the existing set of partitions and then the existing partitions are adjusted using the partition refinement step. Instead of adjusting all the existing partitions (which could be expensive), the process restricts the refinement to only the previous partition. This process (GREP) can be executed much faster than the LP-based process (MBS_EQP) shown earlier. It can be shown to provide a performance close to the optimal process (MBS_EQP).

One exemplary pseudo-code for the greedy process for EQP is shown next.

| Algorithm 2 Greedy Algorithm for EQP: GREP |
|---|
| 1:    AP obtains the bottleneck (effective) RSSI for each of its active beams in B, $R_j^* = \min_{i:b_{ij}^*=j}\{R_{ij}^*\}$, $\forall j \in [1, |B|]$ |
| 2:    AP arranges the beams in the decreasing order of effective RSSI: $\Pi = \{\max_j R_j^*, \ldots, \min_j R_j^*\}$; $b_{\Pi(k)}$-beam index of $k^{th}$ element in $\Pi$ |
| 3:    $C = \{\}$, $P = \{\}$, $prev = 0$, $n = 0$ |
| 4:    while $C \neq \Pi$ do |
| 5:      $min\_cost = MAX$, $new = 0$ |
| 6:      for $j \in [prev + 1 : |B|]$ do |
| 7:        $cost_{\it eff} = \dfrac{L/W}{(j - prev)\log_2\left(1 + \dfrac{\Pi(j)}{j - prev}\right)}$ |
| 8:        if $cost_{\it eff} \leq min\_cost$ then |

Algorithm 2 Greedy Algorithm for EQP: GREP

```
 9:           min_cost = cost_eff; new = j
10:        end if
11:     end for
12:     if new ≠ 0 then
13:        P ← P ∪ {new}, C ← C ∪_{j=prev+1}^{new} Π(j)
14:        prev = new; n = |P|
15:        Refine_Partition(P, n − 1)
16:     end if
17:  end while
18:  % Obtain beam pattern and rate on each partition, q
19:  for q ∈ [1, |P|] do
20:
```
$$B_q(k) = \frac{\sum_{j=P[q-1]}^{P[q]} A(k, b_{\Pi(j)} - 1)}{\sqrt{P[q] - P[q-1]}}$$

21:
$$Rate_q = \frac{L}{W \log_2\left(1 + \frac{\Pi(P[q])}{P[q] - P[q-1]}\right)}$$

```
22:  end for
23:  Refine_Partition(P, n − 1)
24:  min_cost = MAX, prev_ref = P[n − 1]
25:  for k ∈ [P[n − 2] : P[n]] do
26:
```
$$cost = \frac{L}{W \log_2\left(1 + \frac{\Pi(k)}{k - P[n-2]}\right)} + \frac{L}{W \log_2\left(1 + \frac{\Pi(P[n])}{P[n] - k}\right)}$$

```
27:     if cost < min_cost then
28:        min_cost = cost; prev_ref = k
29:     end if
30:  end for
31:  P[n − 1] = prev_ref
```

The system provides a higher quality solution in terms of minimizing the total multicast transmission time compared to conventional systems. The system provides flexibility in terms of being able to leverage power control, if the system allows such control, to allow faster multicast transmissions. The system considers practical restrictions such as discrete rates in designing the solutions.

Figure 4:
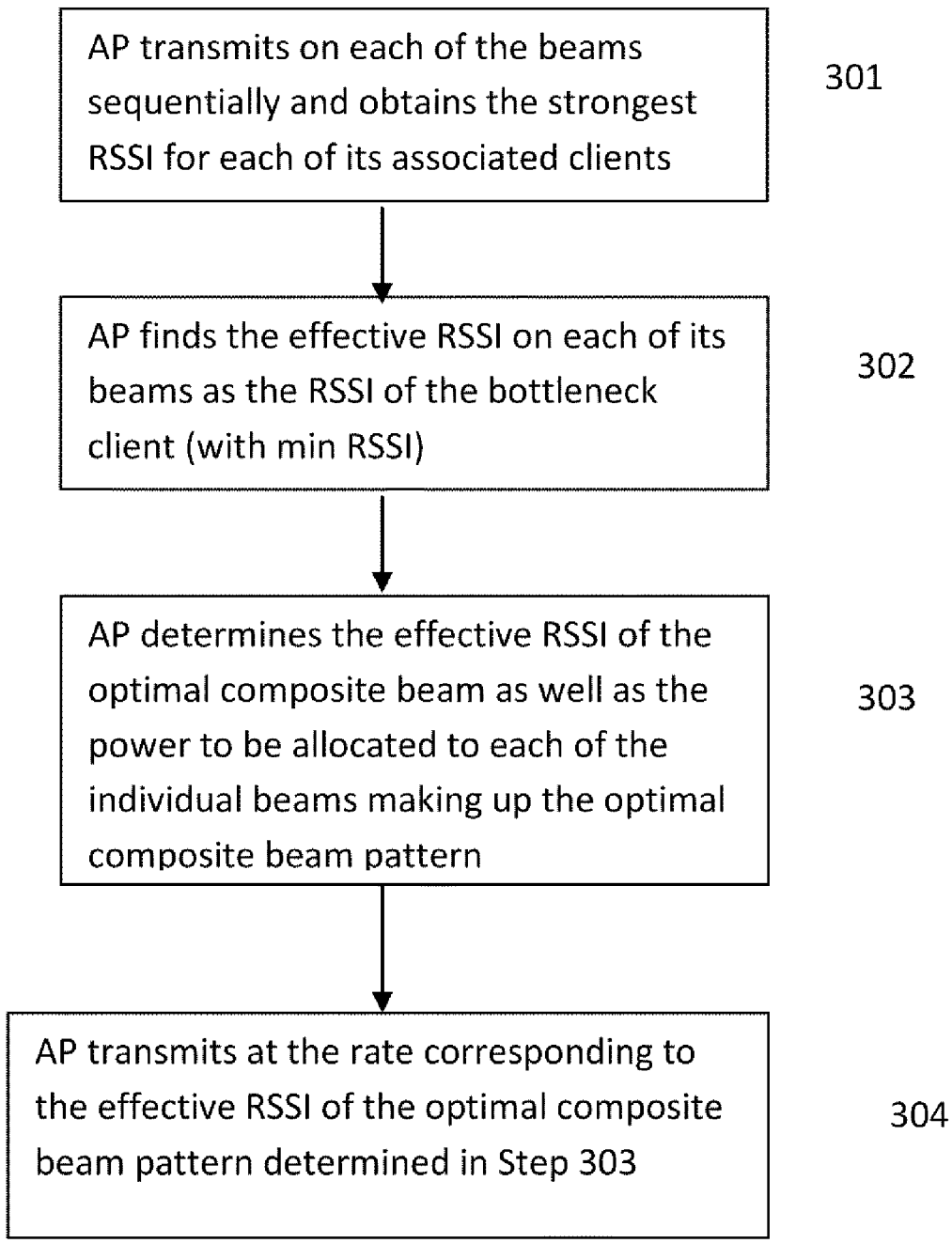
FIG. 4 shows an exemplary multicast beam scheduler process for ASP Model with the optimal Solution for Continuous Rates.

Next, an embodiment will be discussed where the power allocated to each of the beams within a partition can be controlled in an asymmetric fashion (ASP Model). FIG. 4 shows an exemplary multicast beam scheduler process for ASP Model with the optimal Solution for Continuous Rates. With the ASP model, it can be shown that no partitioning is needed if the transmission can use any transmission rate from a continuous set of rates. This means, the optimal solution is one where all the users are covered by a single composite, possibly multi-lobe, beam pattern (ie. a single partition).

First, in 301, the access point (AP) transmits sequentially on all its beams and the clients determine the beam on which the strongest RSSI (received signal strength indicator) was received as well as the corresponding RSSI value. Every client feeds back the strongest RSSI and the corresponding beam identification.

In 302, the AP then determines the effective RSSI ($R_j^*$) for each of the possible switched beams (there could be a total of K beams for a K element antenna array) as the RSSI of the bottleneck client, namely the client reporting the lowest RSSI on that beam.

$$R_j^* = \min_{i:b_{ij}^* = j}\{R_{ij}^*\}; \forall j \in [1, K]$$

In 303, the AP determines the effective RSSI of the optimal composite beam as well as the power to be allocated to each of the individual beams making up the optimal composite beam pattern as follows $$\bar{\lambda} = \frac{1}{\frac{1}{R_1^*} + \frac{1}{R_2^*} \cdots \frac{1}{R_{|B|}^*}}; \lambda_j = \frac{P\bar{\lambda}}{R_j^*}; \text{ and } B(k) = \sum_{j \in B}\sqrt{\lambda_j} A(K, j-1)$$

Where $\bar{\lambda}$ is the effective RSSI of the composite beam; $\lambda_j$ is the power allocation fraction for constituent beam 'j'; and B(k) is the optimal composite beam pattern.

Next, in 304, the AP transmits at the rate corresponding to the effective RSSI of the optimal composite beam pattern determined in 303.

Algorithm 3 Multicast Beam Scheduler for ASP: MAP

1: AP obtains the bottleneck (effective) RSSI for each of its active beams in B, $R_j^* = \min_{i:b_{ij}^* = j}\{R_{ij}^*\}, \forall j \in [1, |B|]$ 2: AP determines $\bar{\lambda} = \dfrac{1}{\frac{1}{R_1^*} + \frac{1}{R_2^*} \cdots \frac{1}{R_{|B|}^*}}$, and $\lambda_j = \dfrac{S\lambda}{R_j^*}$ 3: AP determines composite beam pattern, B(k) = $\sum_{j \in B}\sqrt{\lambda_j} A(k, j-1)$ and transmits at rate, Rate = $\dfrac{L}{W \log_2(1 + \lambda)}$ The above process assumes that continuous set of rates can be used and provides a simple process that only needs to compute a) the beam pattern to be used to create the multi-lobe beam, b) the power to be allocated to each antenna element, and c) the rate to be used for the transmission. Although the above process is simple to implement and does not require partitioning, in practice it is not readily applicable as only discrete rates are allowed for transmission in practical systems. With discrete rates, partitioning is needed even for the ASP model. One way to do this is to modify the GREP process presented earlier a little to accommodate asymmetric power control (which is referred to as GRASP1—see attached document). But given that GREP picks a partition using beams which are contiguous, GRASP1 does the same. It can be shown that for the ASP model, an optimal solution could be one where a partition contains non-contiguous beams.

Figure 5:
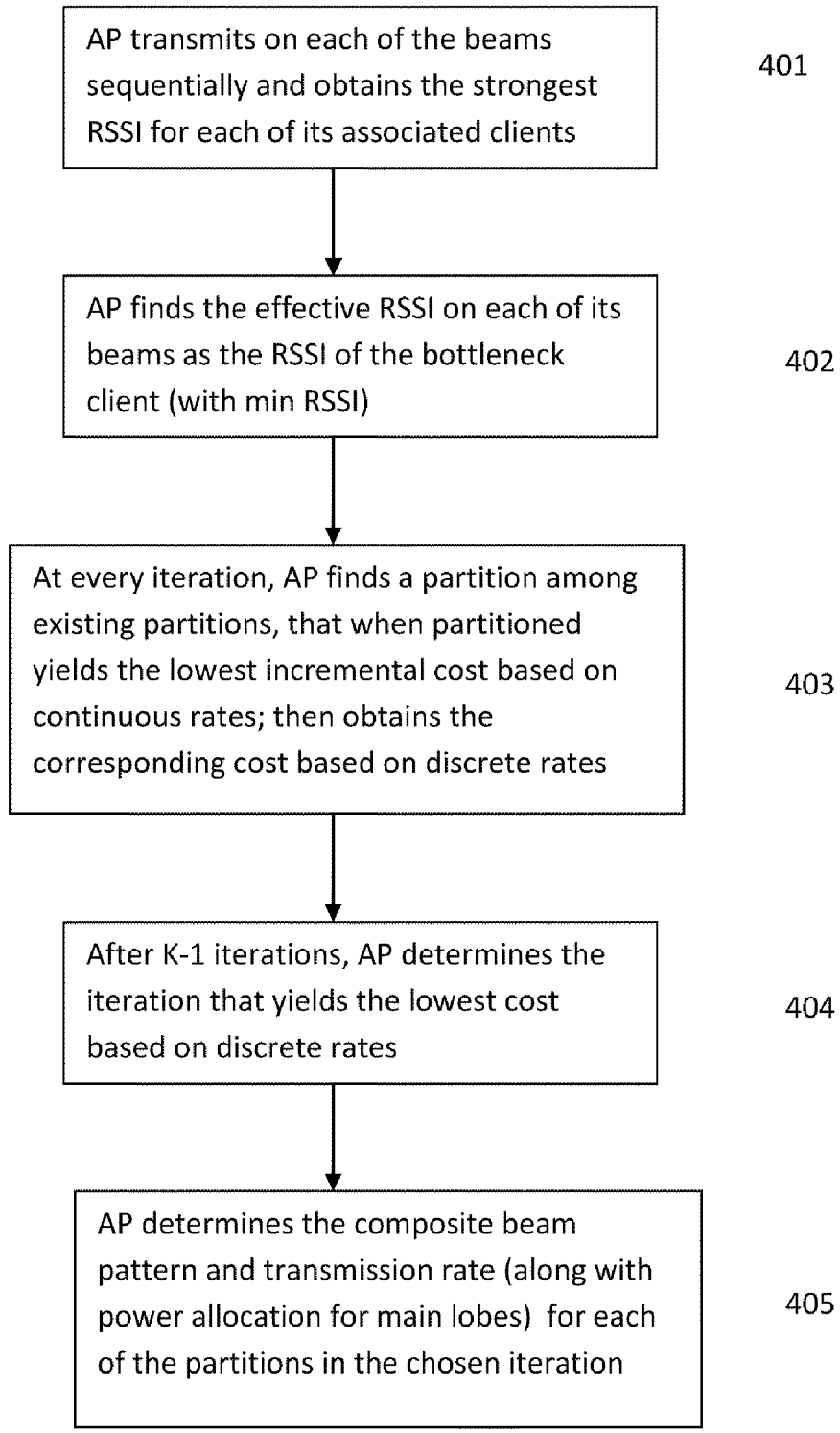
FIG. 5 shows an exemplary a greedy solution for discrete rates.

To address this limitation, the process of FIG. 5 (GRASP2) provides a greedy solution for discrete rates. GRASP2 is an iterative greedy algorithm where at each of the iterations, the process finds a partition that yields the lowest incremental cost when partitioned. It finds the best k partition in iteration k−1 assuming that the rates are continuous and then determines the corresponding cost using discrete rates. The best set of partitions among all iterations that minimizes this cost is then picked as the solution. Then, the beam pattern and the rates for each of the partitions is determined and used for sequential transmissions.

Algorithm 4 Greedy Algorithm for ASP: GRASP2

1: AP obtains the bottleneck (effective) RSSI for each of its beams in B, $R_j^* = \min_{i:b_{ij}^* = j}\{R_{ij}^*\}, \forall j \in [1, |B|]$ 2: $P_1 \leftarrow \{B\}; cost_1^d = f(P_1) = \dfrac{L}{T\left(\dfrac{1}{\sum_{j \in P_1} \frac{1}{R_j^*}}\right)}; npart = 1$ 3: for k ∈ [1 : |B| − 1] do

| Algorithm 4 Greedy Algorithm for ASP: GRASP2 |
|---|
| 4: $(X_k, Y_k) \leftarrow \arg\min\{f(X)+f(Y\setminus X)-f(Y) \mid \emptyset \neq X \subset Y, Y \in P_k\}$ |
| 5: $P_{k+1} \leftarrow (P_k - \{Y_k\}) \cup \{X_k, Y_k \setminus X_k\}$ |
| 6: AP determines discrete cost for partitions in $P_{k+1}$ as $$\text{cost}_{k+1}^d = \Sigma_{G \in P_{k+1}} \frac{L}{T\left(\frac{1}{\Sigma_{j \in G} \frac{1}{R_j^*}}\right)}$$ |
| 7: if $\text{cost}_{k+1}^d < \min\_\text{cost}$ then |
| 8: $\min\_\text{cost} = \text{cost}_{k+1}^d$; npart = k + 1 |
| 9: end if |
| 10: end for |
| 11: AP determines the rate and composite beam pattern for each of the partitions in $P_{npart}$ using Eqn. 5. |

First, in 401, the access point (AP) transmits sequentially on all its beams and the clients determine the beam on which the strongest RSSI (received signal strength indicator) was received as well as the corresponding RSSI value. Every client feeds back the strongest RSSI and the corresponding beam identification.

Next, in 402, the AP then determines the effective RSSI ($R_j^*$) for each of the possible switched beams (there could be a total of K beams for a K element antenna array) as the RSSI of the bottleneck client, namely the client reporting the lowest RSSI on that beam.

$$R_j^* = \min_{i:b_{ij}^*=j}\{R_{ij}^*\}; \forall j \in [1,K]$$

At each iteration in 403, the AP finds a partition among existing partitions, that when partitioned yields the lowest incremental cost based on continuous rates; then obtains the corresponding cost based on discrete rates.

$$(X_k, Y_k) \leftarrow \arg\min\{f(X)+f(Y\setminus X)-f(Y) \mid \emptyset \neq X \subset Y, Y \in P_k\}$$

$$P_{k+1} \leftarrow (P_k - \{Y_k\}) \cup \{X_k, Y_k \setminus X_k\}$$

AP determines discrete cost for partitions in $P_{k+1}$ as $$\text{cost}_{k+1}^d = \sum_{G \in P_{k+1}} \frac{L}{T\left(\sum_{j \in G} \frac{1}{R_j^*}\right)}$$

if $\text{cost}_{k+1}^d < \min\_\text{cost}$ then $npart = k + 1$ end

Next, in 404, after K−1 iterations, AP determines the iteration 'npart' that yields the lowest cost based on discrete rates. In 405, the AP determines the composite beam pattern and transmission rate (along with power allocation for main lobes) for each of the partitions in the chosen iteration. This is achieved similar to 303.

In 406, the AP transmits sequentially for each of the partitions using the parameters determined in 405.

The system achieves an optimal solution through the use of composite (multi-lobe) beam patterns. By varying the signal footprint on a fine granularity, relative to purely directional and omni approaches, composite beams provide good control the operating point of the tradeoff curve. By adjusting the power across the different main lobes in a composite beam, the system can further control the signal footprint and strike this tradeoff more effectively. In the first model (EQP), the transmit power is equally split among the main lobes of the composite beam. In the second model (ASP), power is allowed to be asymmetrically split between the constituent main lobes. This allows the signal to be reinforced more in certain main lobes as opposed to the others and provides more flexibility in forming the composite beam.

Additional advantages may include the following. In addition to the generation of an optimal beam pattern, the system also addresses the closely coupled issue of scheduling of beam patterns since it can be sub-optimal to transmit to all clients simultaneously using a single composite beam pattern or to beamform sequentially (using single lobe patterns) in each of the directions to cover all clients. Thus, the system performs scheduling (partitioning) of users into groups that will operate in different timeslots, and determining the optimal beam patterns and rate of operation for each group. The system provides optimal solutions under both the models for the continuous rate (Shannon rate function) case. The system also uses easy-to-implement greedy solutions with performance guarantees for both the models that exhibit near optimal performance. The greedy solutions are readily extended to the discrete rate case (eg. 802.11a/b), which is the practical model of operation in wireless standards. In one comprehensive test, the system achieves performance gains of four folds over omni and two folds over baseline schemes and schemes in related work. The simple greedy nature of the solutions also lends itself to easy implementation and deployment.

The system may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for multicasting in a wireless network using an access point (AP), comprising:
   [a.] partitioning a multicast group into a plurality of partitions where each partition has a mutually exclusive subset of users or clients;
   [b.] scheduling beam transmission with switched beam-forming antennas;
   [c.] performing the multicast transmission in accordance with the beam scheduling;
   transmitting sequentially each beam and obtaining the strongest received signal strength indication (RSSI) for each associated client;
   determining an effective RSSI on each beam as the RSSI of a bottleneck client; and
   arranging beams in decreasing order of effective RSSI.

2. The method of claim 1, comprising sending users in the same partition the multicast data through a broadcast.

3. The method of claim 1, comprising sending data to users in different partitions sequentially.

4. The method of claim 1, wherein the AP determines a composite beam pattern and rate for transmission to each of the partitions.

5. The method of claim 1, wherein the AP transmits multicast data through a composite beam pattern at a rate sufficient for all users in the partition to decode the transmitted data.

6. The method of claim 1, comprising performing equal power splitting.

7. The method of claim 6, comprising determining an optimal solution that partitions the set of beams arranged in decreasing order of effective RSSI in a contiguous manner.

8. The method of claim 6, comprising determining an optimal solution that picks a composite beam pattern and rate for each partition to minimize aggregate transmission time for continuous and discrete rates.

9. The method of claim 6, comprising:
formulating an integer program as $$SPP\text{: Minimize } \sum_{j=1}^{M} c_j y_j;\ \text{s.t.} \sum_{j=1}^{M} a_{ij} y_j = 1, \forall i \in [1, K]$$

$$\text{where } c_j = \frac{L}{B\log_2\left(1 + \frac{\min_i \{a_{ij} R_i^*\}}{\sum_i a_{ij}}\right)};\ a_{ij}, y_j = \{0, 1\};$$

solving a linear program relaxation to obtain one or more partitions; and
determining a beam pattern and a rate for each partition.

10. The method of claim 6, comprising determining a low complexity near optimal solution that picks a composite beam pattern and rate for each pattern to minimize an aggregate transmission time for continuous and discrete rates using an effective cost of partitions as metric.

11. The method of claim 10, comprising determining a partition with a lowest effective cost among uncovered beams.

12. The method of claim 10, comprising adjusting a current partition with a prior partition to minimize cost.

13. The method of claim 6, comprising determining

Effective cost of partition=(Cost of partition)/(Number of beams covered).

14. A method for multicasting in a wireless network using an access point (AP), comprising:
partitioning a multicast group into a plurality of partitions where each partition has a mutually exclusive subset of users or clients; and
scheduling beam transmission with switched beamforming antennas;
performing the multicast transmission in accordance with the beam scheduling;
performing equal power splitting; and
determining an optimal solution that partitions the set of beams arranged in decreasing order of effective RSSI in a contiguous manner.

15. A method for multicasting in a wireless network using an access point (AP), comprising:
partitioning a multicast group into a plurality of partitions where each partition has a mutually exclusive subset of users or clients; and
scheduling beam transmission with switched beamforming antennas;
performing the multicast transmission in accordance with the beam scheduling;
performing asymmetric power control; and
determining an optimal solution for continuous rates that picks a single composite beam pattern, transmission rate for the composite pattern and power allocation to constituent beams in the composite pattern to minimize aggregate transmission time.

16. The method of claim 15, comprising determining a near-optimal solution for discrete rates that partitions the set of beams non-contiguously.

17. The method of claim 16, comprising determining a near-optimal solution for discrete rates that involves multiple partitions, and picks a composite beam pattern for every partition, transmission rate for each pattern and power allocation to constituent beams in the composite pattern to minimize aggregate transmission time.

18. The method of claim 16, comprising determining the specific partitions of lowest cost based on discrete rates for a given number of partitions as input, and picking the best set of partitions yielding the lowest cost among various inputs.

19. The method of claim 18, comprising increasing the number of partitions by
determining a partition among existing partitions that when further partitioned into two yields the lowest incremental cost based on continuous rates; and
obtaining a corresponding cost based on discrete rates.

* * * * *